United States Patent
Keski-Valkama

(10) Patent No.: US 11,783,187 B2
(45) Date of Patent: Oct. 10, 2023

(54) METHOD, APPARATUS, AND SYSTEM FOR PROGRESSIVE TRAINING OF EVOLVING MACHINE LEARNING ARCHITECTURES

(71) Applicant: HERE Global B.V., Eindhoven (NL)

(72) Inventor: Tero Juhani Keski-Valkama, Zürich (CH)

(73) Assignee: HERE GLOBAL B.V., Eindhoven (NL)

( * ) Notice: Subject to any disclaimer, the term of this patent is extended or adjusted under 35 U.S.C. 154(b) by 711 days.

(21) Appl. No.: 16/809,243

(22) Filed: Mar. 4, 2020

(65) Prior Publication Data

US 2021/0279585 A1    Sep. 9, 2021

(51) Int. Cl.
*G06N 3/082* (2023.01)
*G06N 20/00* (2019.01)
*G06F 18/21* (2023.01)
*G06F 18/24* (2023.01)

(52) U.S. Cl.
CPC ........... *G06N 3/082* (2013.01); *G06F 18/217* (2023.01); *G06F 18/24765* (2023.01); *G06N 20/00* (2019.01)

(58) Field of Classification Search
CPC ...... G06N 3/082; G06N 20/00; G06N 3/0454; G06K 9/626; G06K 9/6262
See application file for complete search history.

(56) References Cited

U.S. PATENT DOCUMENTS

| | | | | |
|---|---|---|---|---|
| 5,146,543 A | * | 9/1992 | Vassiliadis | G06N 3/063 706/41 |
| 5,253,330 A | * | 10/1993 | Ramacher | G06N 3/04 706/42 |
| 5,479,579 A | * | 12/1995 | Duong | G06N 3/063 706/20 |

(Continued)

FOREIGN PATENT DOCUMENTS

WO    2019001649 A1    1/2019

OTHER PUBLICATIONS

Office Action for related European Patent Application No. 21160242.0-1208, dated Dec. 16, 2021, 9 pages.

(Continued)

*Primary Examiner* — Lewis G West

(57) ABSTRACT

An approach is provided for progressive training of long-lived, evolving machine learning architectures. The approach involves, for example, determining alternative paths for the evolution of the machine learning model from a first architecture to a second architecture. The approach also involves determining one or more migration step alternatives in the alternative paths. The migration steps, for instance, include architecture options for the evolution of the machine learning model. The approach further involves processing data using the options to determine respective model performance data. The approach further involves selecting a migration step from the one or more migration step alternatives based on the respective model performance data to control a rate of migration steps over a rate of training (Continued)

in the evolution of the machine learning model. The approach further involves initiating a deployment the selected migration step to the machine learning model.

20 Claims, 14 Drawing Sheets

(56) References Cited

U.S. PATENT DOCUMENTS

| | | | | |
|---|---|---|---|---|
| 6,882,992 | B1* | 4/2005 | Werbos | G05B 13/027 706/48 |
| 2008/0152217 | A1* | 6/2008 | Greer | G06F 18/21355 375/240 |
| 2010/0211536 | A1* | 8/2010 | Al-Fattah | E21B 49/00 706/21 |
| 2014/0282314 | A1* | 9/2014 | Mohanty | G06F 30/30 716/106 |
| 2017/0337464 | A1 | 11/2017 | Rabinowitz et al. | |
| 2019/0108433 | A1* | 4/2019 | Hsu | G06N 3/063 |
| 2020/0410346 | A1* | 12/2020 | Rappoport | G06N 3/04 |
| 2021/0201107 | A1* | 7/2021 | Laszlo | G10L 25/30 |
| 2021/0201119 | A1* | 7/2021 | Laszlo | G06N 3/04 |
| 2021/0201131 | A1* | 7/2021 | Laszlo | G06N 3/086 |
| 2021/0201158 | A1* | 7/2021 | Laszlo | G06F 18/2113 |
| 2022/0036150 | A1* | 2/2022 | Hassantabar | G06N 3/082 |
| 2022/0114439 | A1* | 4/2022 | Keski-Valkama | G06N 3/08 |

OTHER PUBLICATIONS

Islam et al., "A New Adaptive Merging and Growing Algorithm for Designing Artificial Neural Networks", IEEE Transactions on Systems, Man, and Cybernetics Part B: Cybernetics, vol. 39, No. 3, Jun. 2009, pp. 705-722.

Norouzzadeh et al., "Neuromodulation Improves the Evolution of Forward Models", GECCO '16: Proceedings of the Genetic and Evolutionary Computation Conference, Jul. 20, 2016, pp. 157-164.

Perez-Rua et al., "Efficient Progressive Neural Architecture Search", Aug. 2018, pp. 1-9.

Guan et al., "Incremental Learning with Respect to New Incoming Input Attributes", retrieved on Mar. 4, 2020 from https://bura.brunel.ac.uk/bitstream/2438/1093/1/Incremental%20Learning%20with%20Respect%20to%20New%20Incoming%20Input%20Attributes.PDF, pp. 1-33.

Yoon et al., "Lifelong Learning with Dynamically Expandable Networks", Published as a conference paper at ICLR 2018, Jun. 11, 2018, retrieved from https://arxiv.org/pdf/1708.01547.pdf, pp. 1-11.

Zhang et al., "Regularize, Expand and Compress: Multi-task Based Lifelong Learning via Non-expansive AutoML", Mar. 20, 2019, retrieved from https://arxiv.org/pdf/1903.08362.pdf, pp. 1-9.

* cited by examiner

METHOD, APPARATUS, AND SYSTEM FOR PROGRESSIVE TRAINING OF EVOLVING MACHINE LEARNING ARCHITECTURES

BACKGROUND

Advancements in machine learning are continually providing discoveries of new machine learning architectures and solutions. The pace of these advancements can often be faster than the long training times that may be needed for many machine learning applications. For example, machine learning applications in autonomous driving or other similar use cases may take years of training. Accordingly, service providers face significant technical challenges to incorporating advancements in machine learning architectures into systems while those systems are still in the training phase without having to discard previous training efforts.

SOME EXAMPLE EMBODIMENTS

Therefore, there is a need for an approach for progressive training of evolving long-lived machine learning architectures.

According to one embodiment, a method comprises determining a plurality of alternative paths for the evolution (e.g., step-wise evolution) of the machine learning model from a first architecture to a second architecture. The method also comprises determining one or more migration step alternatives in the plurality of alternative paths. The one or more migration step alternatives include one or more architecture options for the evolution of the machine learning model. The method further comprises processing data using the one or more architecture options to determine respective model performance data. The method further comprises selecting a migration step from the one or more migration step alternatives based on the respective model performance data (e.g., to control a rate of migration steps over a rate of training in the evolution of the machine learning model). The method further comprises initiating a deployment the selected migration step to the machine learning model.

According to another embodiment, an apparatus comprises at least one processor, and at least one memory including computer program code for one or more computer programs, the at least one memory and the computer program code configured to, with the at least one processor, cause, at least in part, the apparatus to determine a plurality of alternative paths for the evolution (e.g., step-wise evolution) of the machine learning model from a first architecture to a second architecture. The apparatus is also caused to determine one or more migration step alternatives in the plurality of alternative paths. The one or more migration step alternatives include one or more architecture options for the evolution of the machine learning model. The apparatus is further caused to process data using the one or more architecture options to determine respective model performance data. The apparatus is further caused to select a migration step from the one or more migration step alternatives based on the respective model performance data (e.g., to control a rate of migration steps over a rate of training in the evolution of the machine learning model). The apparatus is further caused to initiate a deployment the selected migration step to the machine learning model.

According to another embodiment, a non-transitory computer-readable storage medium carries one or more sequences of one or more instructions which, when executed by one or more processors, cause, at least in part, an apparatus to determine a plurality of alternative paths for the evolution (e.g., step-wise evolution) of the machine learning model from a first architecture to a second architecture. The apparatus is also caused to determine one or more migration step alternatives in the plurality of alternative paths. The one or more migration step alternatives include one or more architecture options for the evolution of the machine learning model. The apparatus is further caused to process data using the one or more architecture options to determine respective model performance data. The apparatus is further caused to select a migration step from the one or more migration step alternatives based on the respective model performance data (e.g., to control a rate of migration steps over a rate of training in the evolution of the machine learning model). The apparatus is further caused to initiate a deployment the selected migration step to the machine learning model.

According to another embodiment, an apparatus comprises means for determining a plurality of alternative paths for the evolution (e.g., step-wise evolution) of the machine learning model from a first architecture to a second architecture. The apparatus also comprises means for determining one or more migration step alternatives in the plurality of alternative paths. The one or more migration step alternatives include one or more architecture options for the evolution of the machine learning model. The apparatus further comprises means for processing data using the one or more architecture options to determine respective model performance data. The apparatus further comprises means for selecting a migration step from the one or more migration step alternatives based on the respective model performance data (e.g., to control a rate of migration steps over a rate of training in the evolution of the machine learning model). The apparatus further comprises means for initiating a deployment the selected migration step to the machine learning model.

According to one embodiment, a method comprises identifying one or more migration step alternatives configured to migration a first architecture of a machine learning model to a second architecture of the machine learning model. The method also comprises selecting a migration step from the one or more migration step alternatives. The method further comprises migrating the first architecture to the second architecture by applying the migration step to the first architecture based on a rate of change.

According to another embodiment, an apparatus comprises at least one processor, and at least one memory including computer program code for one or more computer programs, the at least one memory and the computer program code configured to, with the at least one processor, cause, at least in part, the apparatus to identify one or more migration step alternatives configured to migration a first architecture of a machine learning model to a second architecture of the machine learning model. The apparatus also is caused to select a migration step from the one or more migration step alternatives. The apparatus is further caused to migrate the first architecture to the second architecture by applying the migration step to the first architecture based on a rate of change.

According to another embodiment, a non-transitory computer-readable storage medium carries one or more sequences of one or more instructions which, when executed by one or more processors, cause, at least in part, an apparatus to identify one or more migration step alternatives configured to migration a first architecture of a machine learning model to a second architecture of the machine learning model. The apparatus also is caused to select a migration step from the one or more migration step alternatives. The apparatus is further caused to migrate the first architecture to the second architecture by applying the migration step to the first architecture based on a rate of change.

According to another embodiment, an apparatus comprises means for identifying one or more migration step alternatives configured to migration a first architecture of a machine learning model to a second architecture of the machine learning model. The apparatus also comprises means for selecting a migration step from the one or more migration step alternatives. The apparatus further comprises means for migrating the first architecture to the second architecture by applying the migration step to the first architecture based on a rate of change.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for progressive training of machine learning architectures are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
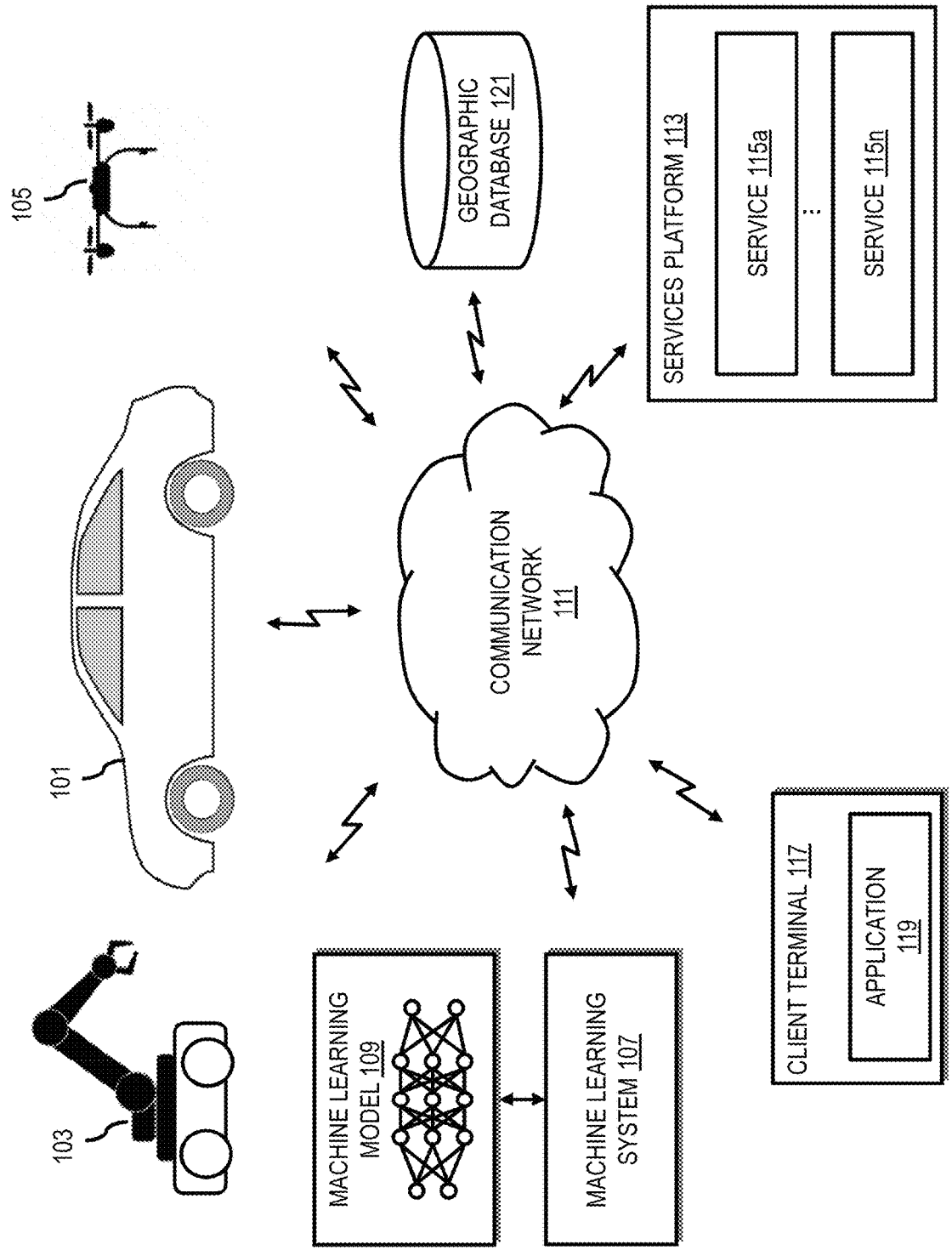
FIG. 1 is a diagram of a system capable of progressive training of long-lived evolving machine learning architectures, according to one embodiment.

FIG. 1 is a diagram of a system capable of progressive training of evolving machine learning architectures, according to one embodiment. Training long-lived neural systems or equivalent machine learning models which have evolving designs throughout their training phases can present significant technical challenges. For example, such long-lived neural systems (e.g., systems employing trained neural networks) generally have model training phases that span a long time (e.g., months, years, etc.). Meanwhile, advances in technology and discoveries of new architectural modules and solutions may need to be incorporated into the system in the middle of training process.

By way of example, systems requiring long training times (e.g., system 100 of FIG. 1) can be about embodied robotics such as autonomous cars (e.g., autonomous vehicle 101), autonomous robots (e.g., robot 103), autonomous drones (e.g., aerial drone 105), and/or the other autonomous devices and systems. Many of these robotic or autonomous uses cases, for example, rely on a machine learning system 107 which include one or more machine learning models 109 (e.g., a neural network or equivalent). The machine learning models 109 can be trained to learn in a human-like fashion while executing activities over a similar time spans as humans do. Potential applications include, but are not limited to, things like robotic/autonomous cars, humanoid robots, etc. In these domains, the learning speed of the machine learning models 109 typically is limited by the time it takes to actually perform the physical activities (e.g., autonomous driving) that are the subject of machine learning, and therefore learning can span ultra-long time spans, e.g., several years or more.

Traditionally, if a new machine learning model architecture (e.g., neural network architecture) is discovered while the existing system is trained, a new system can be retrained with the data recorded by the old system. The new system performance can be compared to the old one, and then the old system is replaced by the new system if the performance improves. However, this approach can be potentially wasteful because all the training of the machine learning model 109 (e.g., neuronal layers and weights of a neural network) done for the old system over a long span of time is discarded, and the training of the new system is started from scratch.

Additionally, the data amounts needed to be stored to replicate the learning done by the old system already can be enormous if that old training time spans several years. It might also be that the new architecture can never quite catch up to the performance level of the old architecture because, the new architecture can never achieve the amount of training time used to train the old system if the old system is continuously trained while it is in use.

To address these technical challenges, the system 100 of FIG. 1 introduces a capability to provide a progressive path from an existing architecture of a machine learning model 109 (e.g., a neural network or equivalent) to another architecture (e.g., an architecture that includes newly discovered solutions). In one embodiment, the system 100 continues to train the machine learning model 109 as the architecture of the machine learning model 109 is migrated along the progressive path to the new architecture. At each step of the progressive path, the system 100 can evaluate different incremental architecture options and select the architecture option that has the least or some other designated level of impact on the performance of the machine learning model 109. In this way, the system 100 can automatically select the incremental architecture change to deploy based on the impact of each change on the performance of the machine learning model 109 without disrupting the current training phase or having to restart the training after changing the architecture of the machine learning model 109.

Figure 2:
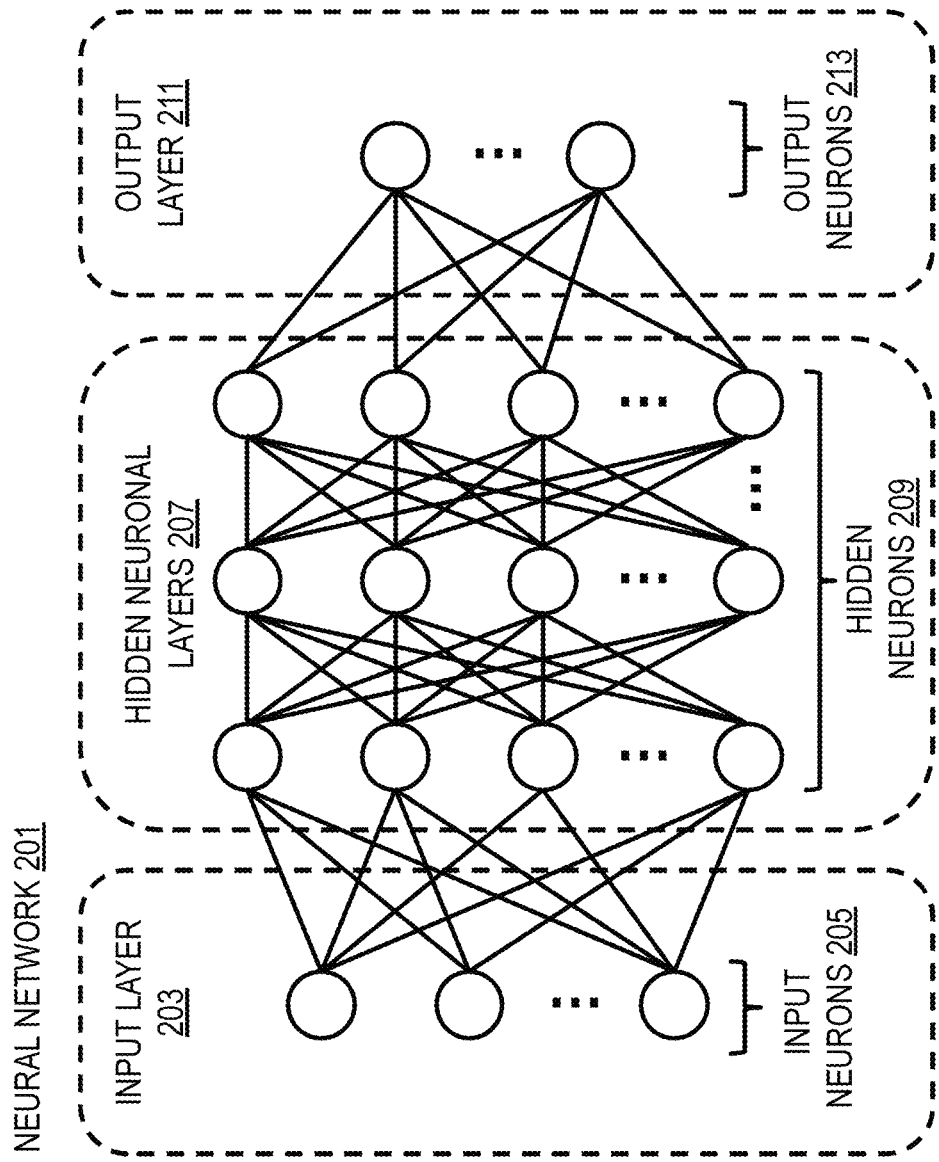
FIG. 2 is a diagram illustrating an example neural network architecture, according to one embodiment.

FIG. 2 illustrates an example neural network 201 (e.g., an example of a machine learning model 109) that has an architecture including an input layer 203 comprising one or more input neurons 205, one or more hidden neuronal layers 207 comprising one or more hidden neurons 209, and an output layer 211 comprising one or more output neurons. In one embodiment, the architecture of the neural network 201 refers to the number of input neurons 205, the number of neuronal layers 207, the number of hidden neurons 209 in the neuronal layers 207, the number of output neurons, or a combination thereof. In addition, the architecture can refer to the activation function used by the neurons, the loss functions applied to train the neural network 201, parameters indicating whether the layers are fully connected (e.g., all neurons of one layer are connected to all neurons of another layer) or partially connected, and/or other equivalent characteristics, parameters, or properties of the neurons 205/209/213, neuronal layers 207, or neural network 201. Although the various embodiments described herein are discussed with respect to a neural network 201, it is contemplated that the various embodiments described herein are applicable to any type of machine learning model 109 that can be migrated between different architectures.

In one embodiment, the progressive path migrates an old architecture of a machine learning model 109 into a new architecture by incrementally adding and removing single neurons or neuronal layers, or smoothly changing activation functions in a fashion which does not affect performance of the machine learning model 109 by more than a designated performance change threshold. For example, a user may wish to migrate a machine learning model 109 from an architecture that has three hidden neuronal layers 207 with four hidden neurons 209 in each layer to a new architecture that has four hidden neuronal layers 207 with four hidden neurons 209 each. The machine learning model 109 has been trained using the old architecture for a significant period of time. To advantageously preserve the training already performed and maintain model performance at a target level, the system 100 can construct a progressive path with four steps that incrementally adds one hidden neuron 209 to the new neuronal layer 207 at each step until the full new neuronal layer 207 is added. In other words, while the machine learning model 109 of the machine learning system 107 is being trained, a new technical solution or architecture may be discovered that can provide improvements to the machine learning model 109 or system 107. Then instead of replacing the old system architecture in a cut-off fashion, the system 100 can construct incremental steps that can be used to progressively migrate the existing trained machine learning model 109 to avoid catastrophic degradation of the trained machine learning model 109's performance.

In one embodiment, while the progressive migration is being done, the training process continues. In this way, the newly added neurons learn relatively quickly their new roles in the machine learning model 109 as their context environment consists of neuronal layers 207 which already know their jobs (e.g., neuronal layers 207 with neurons 209 that have undergone at least some training). After migration the resulting machine learning model 109 has incorporated expert knowledge from the old architecture, but has a new architecture, new technologies incorporated, and/or the like which can potentially improve the performance and learning of the machine learning model 109 in the future. Accordingly, the embodiments of the system 100 described herein provide technical advantages including, but not limited to, providing long-lived machine learning systems 107 that can be trained better while incorporating new advances in machine learning technologies (e.g., neural network technologies).

Figure 3:
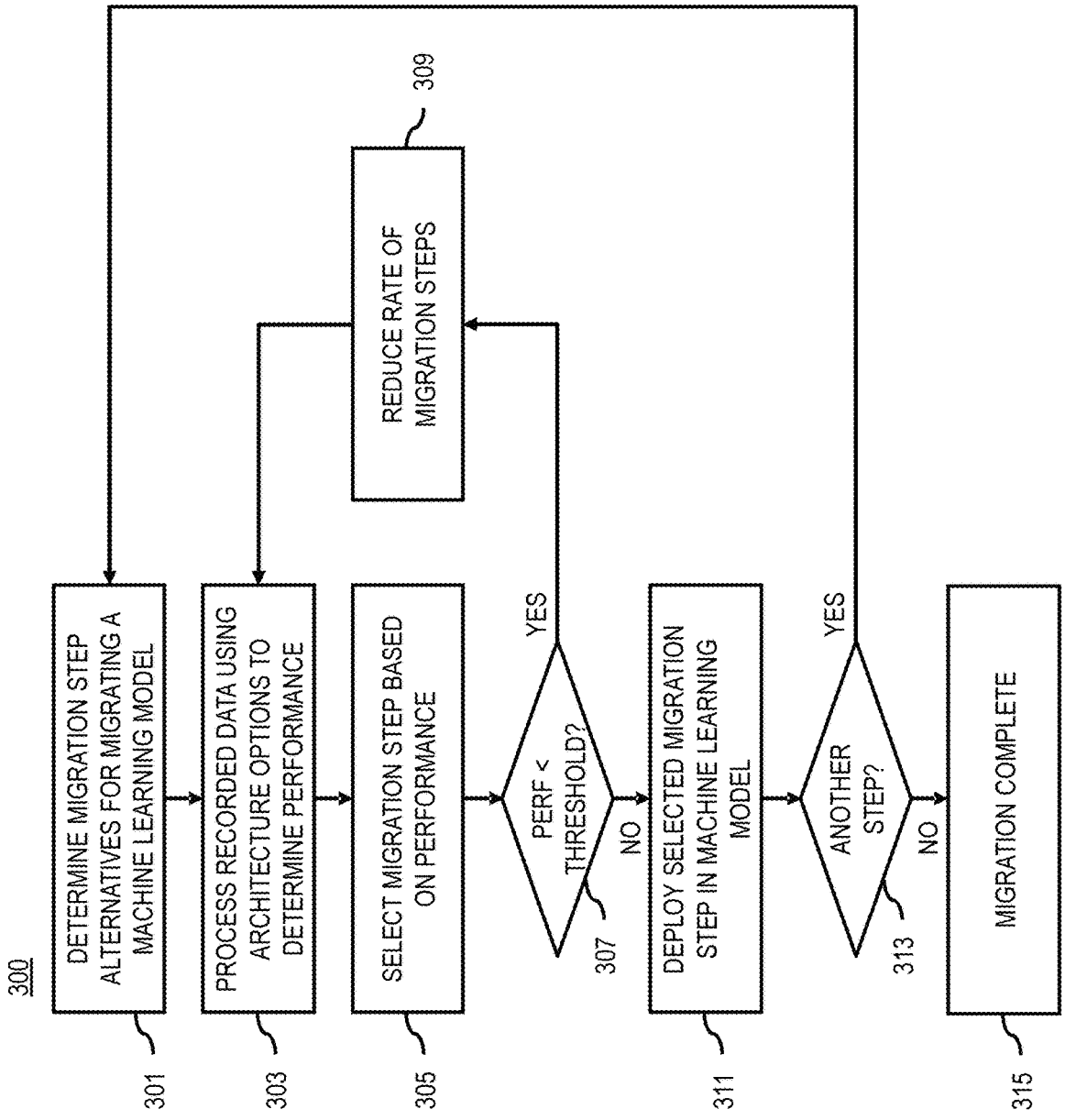
FIG. 3 is a flowchart of a process for progressive training of evolving machine learning architectures, according to one embodiment.
Figure 13:
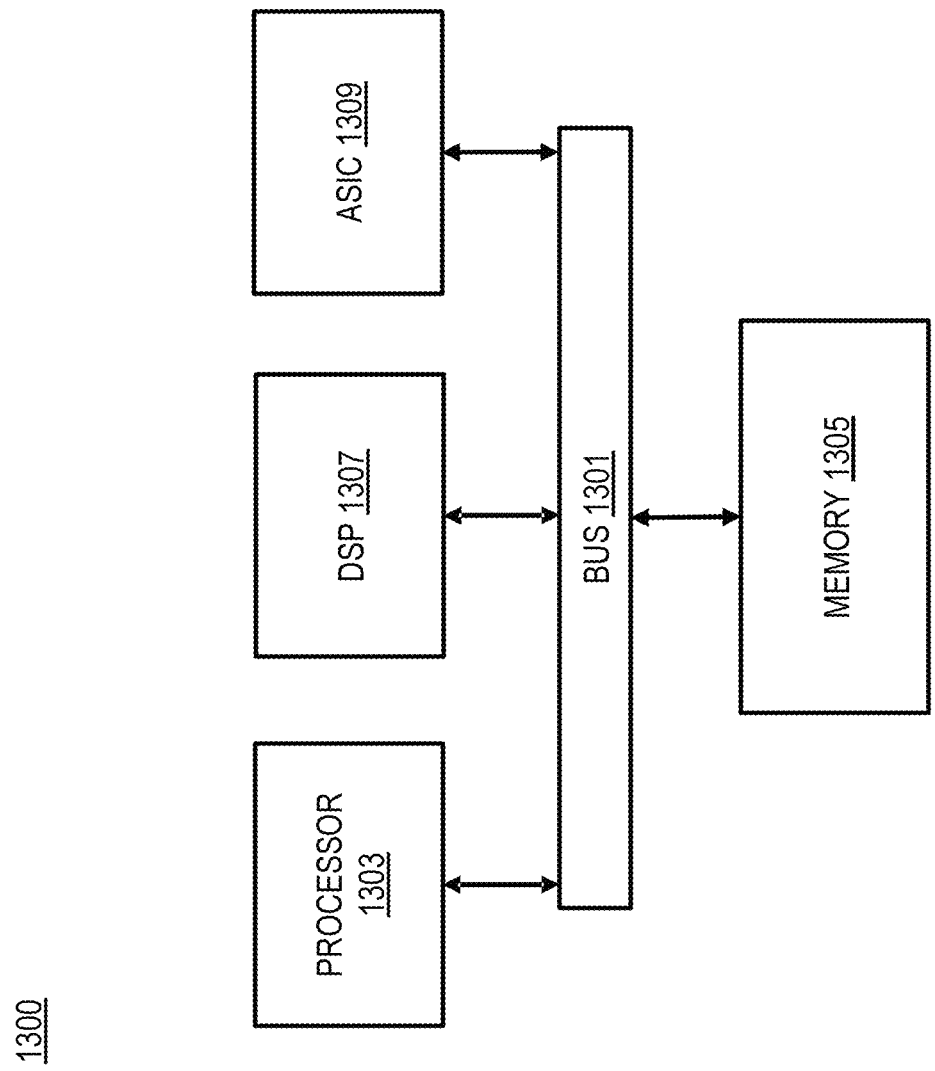
FIG. 13 is a diagram of a chip set that can be used to implement an embodiment of the invention.

FIG. 3 is a flowchart of a process for progressive training of evolving machine learning architectures, according to one embodiment. In one embodiment, the machine learning system 107 and/or any of its components may perform one or more portions of the process 300 and may be implemented in, for instance, a chip set including a processor and a memory as shown in FIG. 13. As such, the machine learning system 107 can provide means for accomplishing various parts of the process 300. For example, the machine learning system 107 can train at least one machine learning model 109 (e.g., a neural network) according to the embodiments described herein to instantiate the trained machine learning model 109 (e.g., over a communication network 111) in a robotic system such as, but not limited to, the autonomous vehicle 101, robot 103, aerial drone 105, and/or the like over a communication network 111. In addition or alternatively, the machine learning model 109 can be instantiated in a services platform 113 and/or one or more services 115a-115m (also collectively referred to as services 115) that can use the machine learning model 109 to perform one or more functions. In yet another embodiment, the machine learning model 109 can be instantiated in a client terminal 117 (or other user device) or application 119 executing on the client terminal 117. Accordingly, in one embodiment, the services platform 113, services 115, client terminal 117, and/or application 119 may perform any combination of the steps of the process 300 alone or in combination with the machine learning system 107. Although the process 300 is illustrated and described as a sequence of steps, it is contemplated that various embodiments of the process 300 may be performed in any order or combination and need not include all of the illustrated steps.

In one embodiment, the process 300 can be initiated when it is determined that the current architecture of a machine learning model 109 is to be migrated to a new architecture (e.g., to incorporate a different or advances in machine learning solutions). The machine learning model 109, for instance, has received at least some training. As described above, the machine learning model 109 can support an application (e.g., autonomous driving, robotics, etc.) that may require extended training over a relatively lengthy period time (e.g., years or more), thereby making the machine learning model 109 "long-lived." During this lengthy training process, a new architecture may have been developed between since the beginning of the training that can provide an improved machine learning solution. To avoid discarding the training that has already begun, the embodiments of the process 300 can be used to progressively train the machine learning model 109 as its architecture is incrementally evolved to the new architecture. It is noted that although the various embodiments are discussed with respect to "long-lived" machine learning models 109 that may be trained over months or years, it is contemplated that the embodiments described herein are applicable to any machine learning model 109 that may undergo architectural changes during its continued training regardless of how long the training phase may be.

By way of example, to perform model training, the machine learning system 107 can incorporate a learning model (e.g., a logistic regression model, Random Forest model, and/or any equivalent model) to train the machine learning model 109 to make predictions (e.g., outputs) from input features or signals. During training, the machine learning system 107 can use a learner module that feeds feature sets from a training data set into the machine learning model 109 to compute a predicted matching feature using an initial set of model parameters. The learner module then compares the predicted matching probability and the predicted feature to ground truth data in the training data set for each observation used for training. The learner module then computes an accuracy of the predictions (e.g., via a loss function) for the initial set of model parameters. If the accuracy or level of performance does not meet a threshold or configured level, the learner module incrementally adjusts the model parameters until the model generates predictions at a desired or configured level of accuracy with respect to the annotated labels in the training data (e.g., the ground truth data). In other words, a "trained" machine learning model 109 has model parameters adjusted to make accurate predictions with respect to the training data set. In the case of a neural network, the model paraments can include, but are not limited to, the coefficients or weights assigned to each connection between neurons of the neural network (e.g., connections represented by the line connecting neurons of the neural network 201 of FIG. 2).

In one embodiment, the architecture of the machine learning model 109 can be evolved using multiple steps that include incremental changes (e.g., addition of a single neuron, neuronal layer, etc.) until the model 109 is fully migrated to the new architecture. At each step of the migration between the old architecture and the new architecture of the machine learning model 109, there may be many alternative migration paths that can lead from the old architecture to the new architecture. Each alternative migration path may include a series of migration steps that implement any of a pool of choices or architecture options which transform the architecture towards the new architecture. Accordingly, in step 301, the machine learning system 107 can determine or identify alternative migration paths for the evolution of the machine learning model 109 from a first architecture to a second architecture. A migration path, for instance, includes a sequence of migration steps configured to migrate the first architecture to the second architecture using architecture options that incrementally transform the machine learning model 109. In one embodiment, between each migration step, the machine learning system 107 can continue to train the machine learning model 109 before proceeding to the next migration step towards the new architecture.

In one embodiment, the one or more migration steps architectural options or changes to the machine learning model including, but not limited to, adding or removing a neuron, adding or removing a neuronal layer, changing an activation function of the neuron, changing a loss function, and/or the like of the machine learning model 109. A neuron, for instance, is a mathematical function that receives inputs (e.g., an input signal, output of preceding neurons, etc.) and then generates an output (e.g., based on an activation function) that can be used for classification, prediction, and/or any other output of the neural network. A neuronal layer is an arrangement of neurons and can include input layers for accepting input signals for classification, hidden layers for processing the input signals, and/or output layer for output the results of the classification/prediction.

Figure 4:
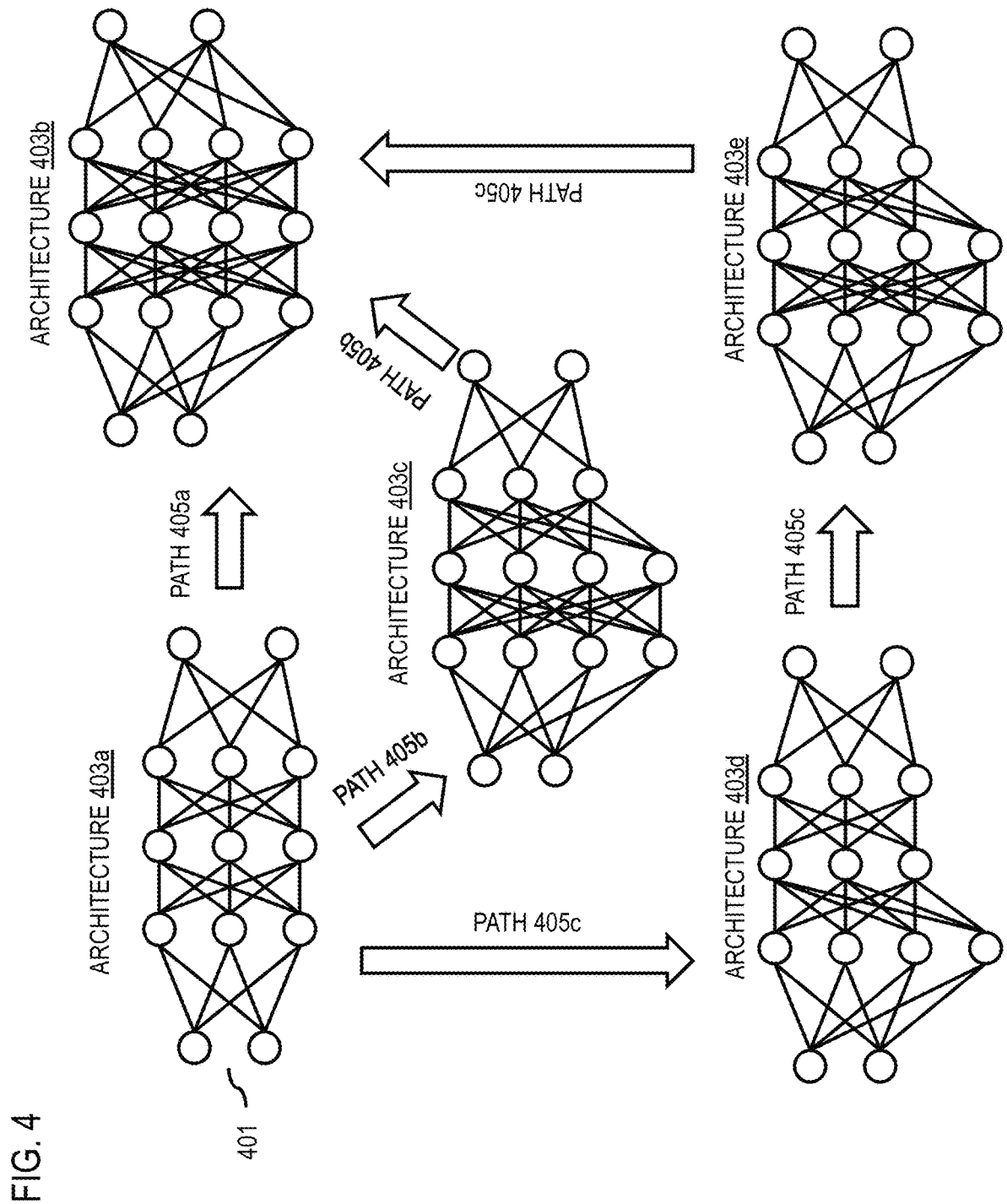
FIG. 4 is a diagram of example architecture options for migrating a machine learning model from one architecture to another architecture, according to one embodiment.

FIG. 4 is a diagram of example alternative migration paths for migrating a machine learning model from one architecture to another architecture, according to one embodiment. In the example of FIG. 4, a neural network 401 (e.g., an example of a machine learning model 109) has an old architecture 403a comprising an input layer with two input neurons, three hidden layers with three hidden neurons each, and an output layer with two output neurons. The neural network 401 is to be migrated to a new architecture 403*b* in which an additional hidden neuron is to be added to each of the three hidden layers of the old architecture 403*a*. The machine learning system 107 determines that there are at least three alternative migration paths 403*a*-403*c* for migrating from the old architecture 403*a* to the new architecture 403*b*:

(a) Alternative migration path 405*a* which includes one migration step:
Migration step 1: Add a neuron to each of the three hidden layers at once to migrate directly from old architecture 403*a* to new architecture 403*b*;

(b) Alternative migration path 405*b* which includes two steps:
Migration step 1: Add a neuron to each of the first two hidden layers of the old architecture 403*a* to incrementally migrate to an intermediate architecture 403*c*; and
Migration step 2: Add a neuron to the third hidden layer of intermediate architecture 403*c* to migrate to the new architecture 403*b*; and (c) Alternative migration path 405*c* which includes three steps:
Migration step 1: Add a neuron to the first hidden layer of the old architecture 403*a* to incrementally migrate to a first intermediate architecture 403*d*;
Migration step 2: Add a neuron to the second hidden layer of the first intermediate architecture 403*d* to incrementally migrate to a second intermediate architecture 403*e*; and
Migration step 3: Add a neuron to the third hidden layer of the second intermediate architecture 403*e* to migrate to the new architecture 403*b*.

Although the examples described above illustrate architectural changes based on changing the number of neurons in the hidden layers, it is contemplated that any other changes are also applicable to the embodiments described herein. These changes include changes to the number of input or output neurons, and adding or removing neuronal layers. Examples of other changes can include changes to the activation function used by the neurons. An activation function, for instance, is any function that can generate an output from the neuron based on the inputs to the neuron. Examples of an activation function include linear activation functions, non-linear activation functions (e.g., derivative/differential functions, monotonic functions, etc.), sigmoid or logistic activation functions, hyperbolic tangent activation functions, rectified linear unit (ReLu) activation functions, and/or any other equivalent functions. The activation function usually maps the values between a specific range (e.g., 0 to 1, −1 to 1, etc.) that can represent a classification or prediction probability of a given output. Thus, an example of an architectural change can include changing from a linear to a sigmoid activation function for one or more neurons. Then, the architectural options of the migration steps can include incrementally inverse weighting from an old activation function to a new activation function. For example, at the first step the weight of the old activation function is 1 and the new activation function is 0, the weight is gradually changed at each migration step until the weight of the old activation is 0 and the weight of the new activation function is 1 to complete the migration. Another progressive migration path can apply the new activation function to one neuron at a time until the old activation function is replaced in all neurons of the neural network.

In one embodiment, neuronal layers can be incrementally added by creating the layer into its respective topological location in the neural network, but initializing the weights of the neurons to zero, or in a way which minimizes the disruption to the existing network. The connections which exist in the original architecture, but do not exist in the new architecture can be optionally used as initial parameters for the new layer inputs. In subsequent architectural migration steps, noise can be progressively added to the neuron connections which do not exist in the final architecture, until a maximum level of noise is reached, and these connections can be removed. Alternatively training gradients can be stopped to the parameters of the connections to be removed, and the weights associated to these can be progressively scaled or interpolated towards zero.

Neuronal layers can be removed by creating new zero-weighted skip-connections over that layer, and similarly as described above the connections not present in the final architecture are progressively removed either by adding progressive noise or by stopping gradients to these connection weights and scaling them step by step towards zero, until the network has learned that these parameters do not matter as their weights approach zero, and they can be removed.

In step 303, the machine learning system 107 evaluates the performance change using input data that is available for testing both the architecture options of the alternative migration paths or steps as well as for testing the current architecture of the machine learning model. For example, the data can be based a designated window of past or newly recorded data for each of the architecture options, migration step alternatives, alternative migration paths, etc. determined or identified according to the embodiments described above. In other words, the machine learning system 107 processes past or new recorded data using the one or more architecture options to determine respective model performance data. This performance data, for instance, can include any metric indicating the accuracy of classifications/predictions made by the neural network. For example, the model performance data can be based on parameters such as, but not limited to, Average Accuracy (ACC) Score, false positives, false negatives, etc. The model performance data can then be compared to the performance of the old architecture (or architecture from a previous migration step) to determine performance change value for the evaluated architecture options. In this way, the machine learning system 107 can generate model performance data for the architecture options associated with the migration step alternatives included in the alternatives migration paths to be evaluated.

In step 305, the machine learning system 107 selects a migration step from the one or more migration step alternatives under consideration based on the respective model performance data. For example, the migration step with an architecture option which reduces the performance of the machine learning model 109 the least can be selected from all of the options or alternatives. As another example, the machine learning system 107 can select the architecture option with the most amount of change that does not reduce model performance by more than a threshold level. The amount of change, for instance, relates to the number or architectural changes in a single migration step (e.g., indicated by the number of neurons, layers, activation functions, loss functions, etc. to be added, removed, or changed in one migration step).

In step 307, the machine learning system 107 can determine whether the performance of the selected migration step meets a model performance threshold. If the performance of the system is likely to suffer too much from the least harmful change (or other selected change/option) towards the new architecture 403*b*, the rate of change or rate of the migration steps can be reduced so that the machine learning system 107 can better adapt before the next migration step (step 309). In this way, the machine learning system 107 can use the selected migration step to control the rate at which the machine learning model 109 is evolved or migrated. In one embodiment, the rate of migration steps can be defined over or with respect to the rate of training in the evolution of the machine learning model 109. In other words, the rate of migrations steps can be defined based on how many training steps are performed between a migration step and a subsequent migration step. As discussed above, after performing a migration step, the machine learning system 107 can then continue training for a specified number of training steps (e.g., 1,000 training steps) before initiating or deploying the next migration step to the machine learning model 109. Then depending on the effect of the migration step on the machine learning model 109's performance, the machine learning system 107 can either increase the rate of migration steps (e.g., by reducing the number of training steps between migration steps—such as by decreasing the training steps to 800) or decrease the rate of migration steps (e.g., by increasing the number of training steps between migration steps—such as by increasing the training steps to 1,200). In addition or alternatively, the machine learning system 100 can vary the rate of change implemented within each migration step by increasing or decreasing the number of architectural changes to be made in a migration step (e.g., add a neuron one at a time in a single migration step versus multiple neurons in a single migration step).

For example, in step 309, if the model performance threshold is not met, the rate of change or rate of migration steps of the machine learning model implemented in the one or more architecture migration step alternatives can be reduced. For example, if the original migration step changed the architecture by adding two neurons at a time, the rate of change of the options can be reduced to adding just one neuron at a time to improve performance. In another example, as described above, if a neuron is added in every 1,000 training steps, the rate of change can be reduced by increasing the interval to, e.g., 1,200 training steps. The process 300 can then roll back to step 303 to evaluate the architecture options or migration step alternatives with the reduced rate of change. Alternatively, the new rate of change can be applied only to the subsequent migration steps. In other words, the machine learning system 107 can iteratively re-process the past recorded data or newly acquired data using the one or more architecture options with the reduced rate of change. Other options include, but are not limited to, reverting the deployment of the selected migration step if a threshold level of performance is not achieved, redeploying the selected migration step with a reduced rate of change, and/or the like.

In step 311, if the performance threshold is met, the machine learning system 107 initiates a deployment the selected migration step (e.g., step including the architecture options with the least effect on the model performance) to the machine learning model. More specifically, the architecture option(s) for selected step of the migration can be implemented in the production machine learning model 109. FIGS. 5-10 below illustrate example processes for implementing the architectural changes under various scenarios. After deployment of the selected architecture, the machine learning system 107 can determine whether there are any additional steps to complete the migration (step 313). If there are additional steps, the machine learning system 100 can continue training for a designated period of time or a designated amount of additional training before the process returns to step 301 to evaluate the architecture options for performing the next step. In step 315, if there are no other migration steps to perform, the machine learning system 107 determines that the migration is complete.

As noted above, FIGS. 5-10 illustrate processes for implementing architecture changes in a machine learning model, according to various example embodiments. In one embodiment, the machine learning system 107 and/or any of its components may perform one or more portions of the processes described with respect to FIGS. 5-10 and may be implemented in, for instance, a chip set including a processor and a memory as shown in FIG. 13. As such, the machine learning system 107 can provide means for accomplishing various parts of the processes. Although the various processes of FIGS. 5-10 are illustrated and described as a sequence of steps, it is contemplated that various embodiments of the processes may be performed in any order or combination and need not include all of the illustrated steps.

Figure 5:
FIG. 5 is a flowchart of a process for adding a new input to evolve a machine learning architecture, according to one embodiment.

FIG. 5 is a flowchart of a process for adding a new input to evolve a machine learning architecture, according to one embodiment. In one embodiment, new kinds of inputs can be added to the system incrementally by adding them as new connections with connection weights set initially to zero or any other designated default weight. For example, in step 501, the machine learning system 107 can determine that one architecture option or migration step involves adding a new input. The machine learning system 107 designates a connection weight (e.g., 0 or other default value) for the new input (step 503) and adds the new input as a new connection with the designated or default connection weight (step 505). Once the new input is added to the machine learning model 109, the model 109 can continued to be trained so that the model 109 can learn to utilize the new input(s) along with the original ones.

Figure 6:
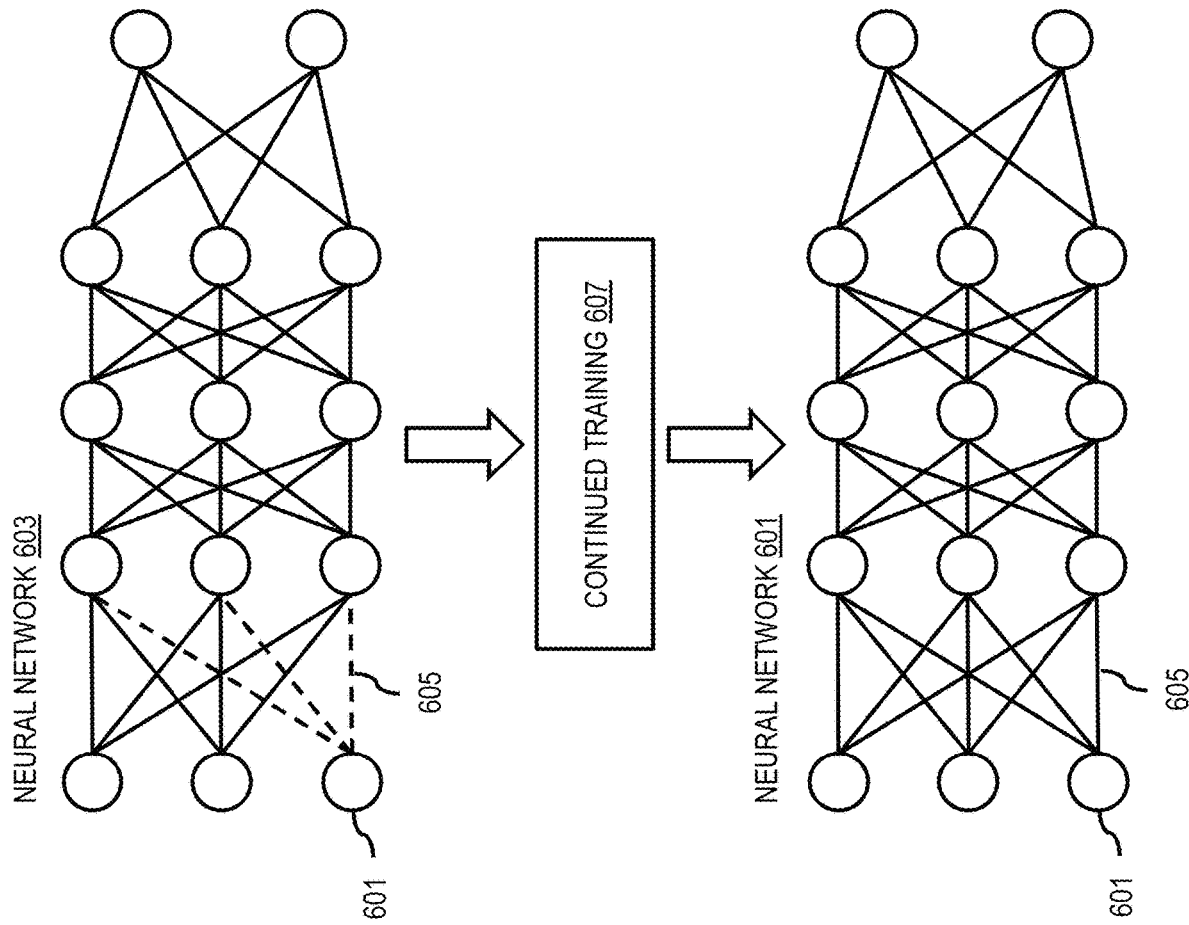
FIG. 6 is a diagram of an example of adding a new input to evolve a machine learning architecture, according to one embodiment.

FIG. 6 is a diagram of an example of adding a new input to evolve a machine learning architecture, according to one embodiment. As shown in FIG. 6, a new input neuron 601 is being added to a neural network 603 as an architectural change. Initially, the machine learning system 107 adds the new input neuron 601 to the input layer of the neural network 603 (e.g., to receive a new input signal or feature). The initial weight of the connection 605 between the new input neuron 601 and the neurons of the adjoining hidden neuronal layer is set to a default value which is indicated by dashed line connections. The neural network 603 then undergoes continue training 607 which causes the neural network 603 to learn connection weights between the new input neuron 601 along with the weights of the original input neurons 609*a* and 609*b* adjusted for the presence of the new input neuron 601. The learned connections weights are then depicted using solid connection lines to indicate that their weights are learned from training.

Figure 7:
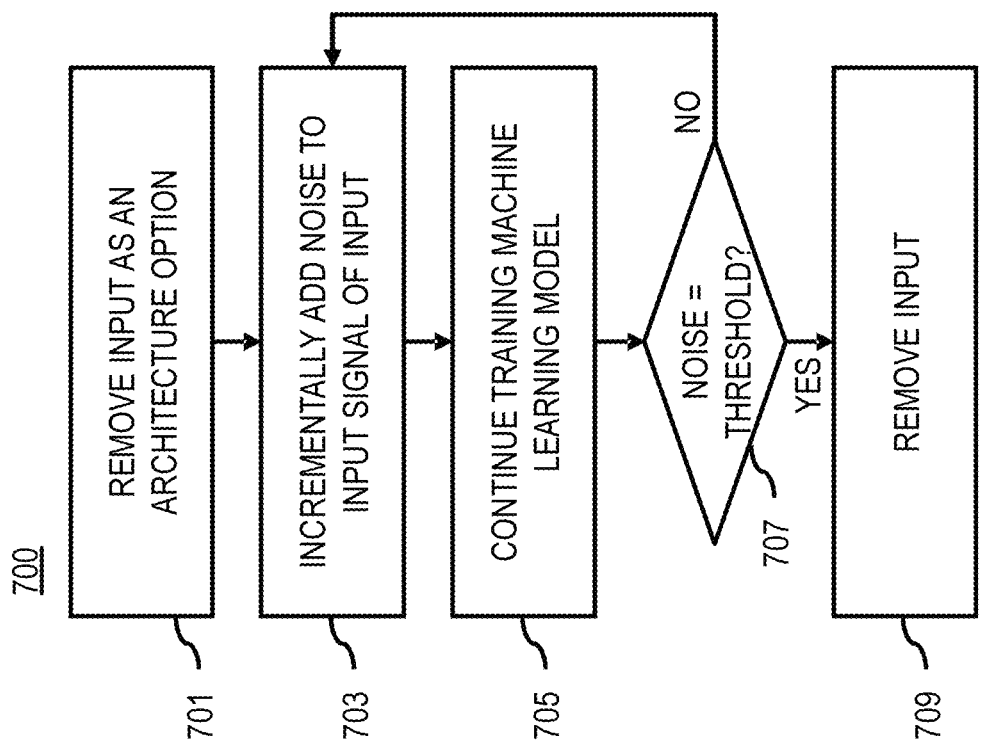
FIG. 7 is a flowchart of a process for removing an input to evolve a machine learning architecture, according to one embodiment.

FIG. 7 is a flowchart of a process for removing an input to evolve a machine learning architecture, according to one embodiment. In step 701, the machine learning system 107 can determine that an architecture option includes removing an input from the machine learning model 109. In one embodiment, old inputs can be removed by incrementally adding noise to their signals to deter the machine learning model 109 from leaning on their information (step 703). In 705, the machine learning system 107 can continue training the machine learning model 109 while also increasing the noise in the input signal of the old input to remove until the input signal is pure noise or has noise equal to or greater than a threshold noise level (step 707). If the noise level in the input signal has not reached a pure noise state or the specified noise threshold value, the process can return to step 703 to increment the noise level and continue training. In step 709, if the noise level has reached the threshold value, the machine learning system 107 can remove the old input from the machine learning model 109.

Figure 8:
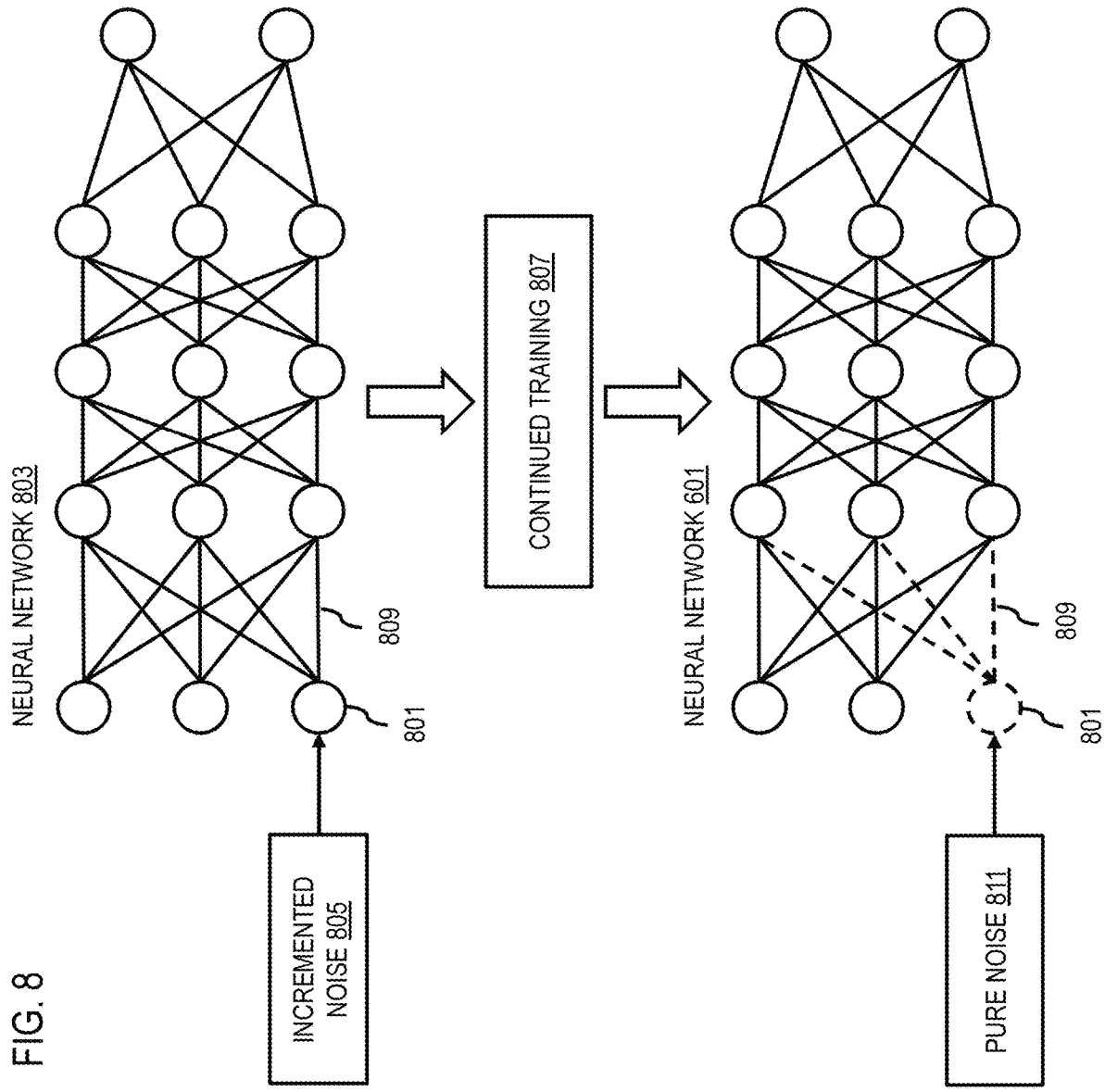
FIG. 8 is a diagram of an example of removing an input to evolve a machine learning architecture, according to one embodiment.

FIG. 8 is a diagram of an example of removing an input to evolve a machine learning architecture, according to one embodiment. In the example of FIG. 8, an old input neuron 801 is being removed from a neural network 803 as an architectural change. To initiate the removal of the old input neuron 801, the machine learning system 107 begins by incrementally introducing noise into the input signal of the old neuron 801. By of example, introducing noise includes mixing in noise values in with the actual input values at a designated rate or percentage (e.g., incremented noise 805). The machine learning model 109 undergoes continued training 807 as the incremented noise 805 is introduced. In one embodiment, the rate that the noise 805 is incremented can be evaluated (e.g., based on model performance data similar to the process for evaluating architecture options) so that the noise does not cause catastrophic performance effects on the neural network 803. As the noise increase, the continued training 807 enables the machine learning model 107 to learn that the connections between the old input neuron 801 and the neurons of the adjoining hidden layer should have decreasing weight. Once the input signal of the old neuron 801 reaches pure noise 811, the machine learning model 107 should learn that the old input 801 is noisy and should have little to no effect on the output of the neural network 803. At this point, the learned weights of the connections 809 should be minimized (if not at or close to zero) as indicated by the dashed connection lines, and the old input neuron 801 can be removed from the neural network 803 without catastrophic effects. Alternatively, an input can be removed by stopping the training gradients to its associated weights, and interpolating its associated weights step by step towards zero over one or more steps.

Figure 9:
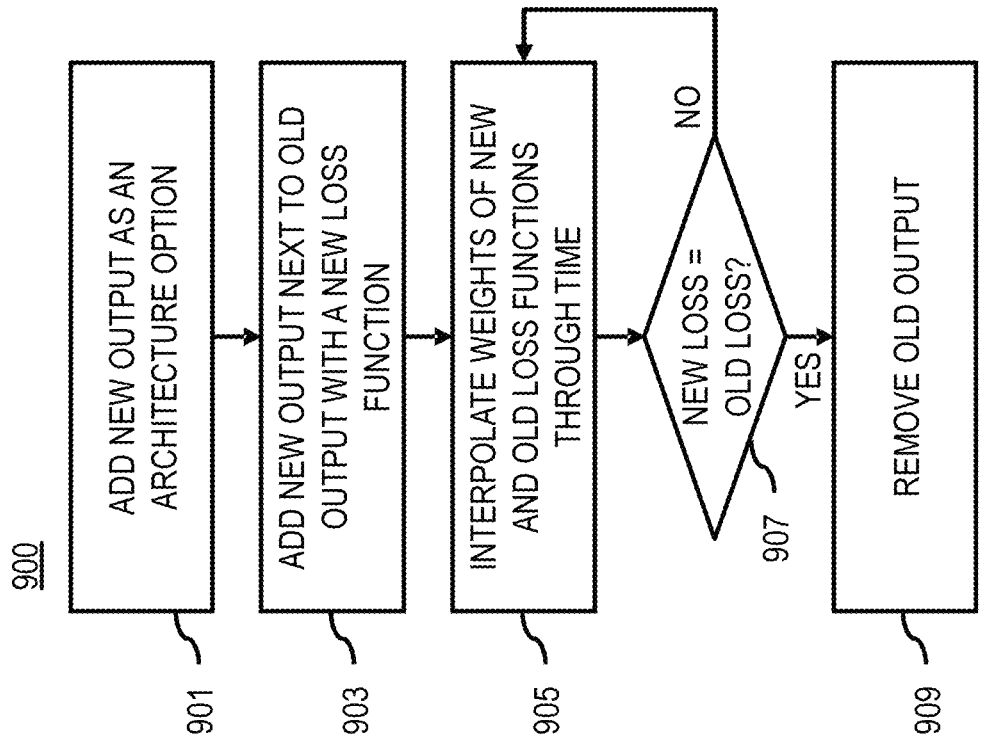
FIG. 9 is a flowchart of a process for adding a new output to evolve a machine learning architecture, according to on embodiment.

FIG. 9 is a flowchart of a process for adding a new output to evolve a machine learning architecture, according to on embodiment. In step 901, the machine learning system 107 can determine that an architecture option includes adding a new output from the machine learning model 109. In one embodiment, new outputs can be added next to the old ones with associated loss functions weighted so that the weight of the new loss is zero (or any other designated value) at the beginning of the migration and the weight of the old loss is one (or any other designated value) (step 903). More generally, the machine learning system 107 can add one or more loss functions for the old and new outputs.

In step 905, the machine learning system 107 specifies a new weight of a new loss associated with the new output is at first designated level and an old weight of an old loss associated with the old output is at a second designated level. In step 905, the machine learning system 107 can interpolate the weights of these loss function are through time so that in the end the new loss forms the complete loss function with the weight of one (or any other designated level) and the old loss is weighted by zero (or some other designated level). In step 907, the machine learning system 107 determines whether weight level of the new loss reaches the original weight level of the old loss (and/or vice versa). If not, the process returns to step 905 to further interpolate the weights of the new and old loss functions. If so, in step 909, the machine learning system 107 can remove the output so that the machine learning model 109 can use the new output instead. Interpolation from the old loss function to the new loss function can be done step by step over the progressive path of evolving the old architecture to the new architecture.

Figure 10:
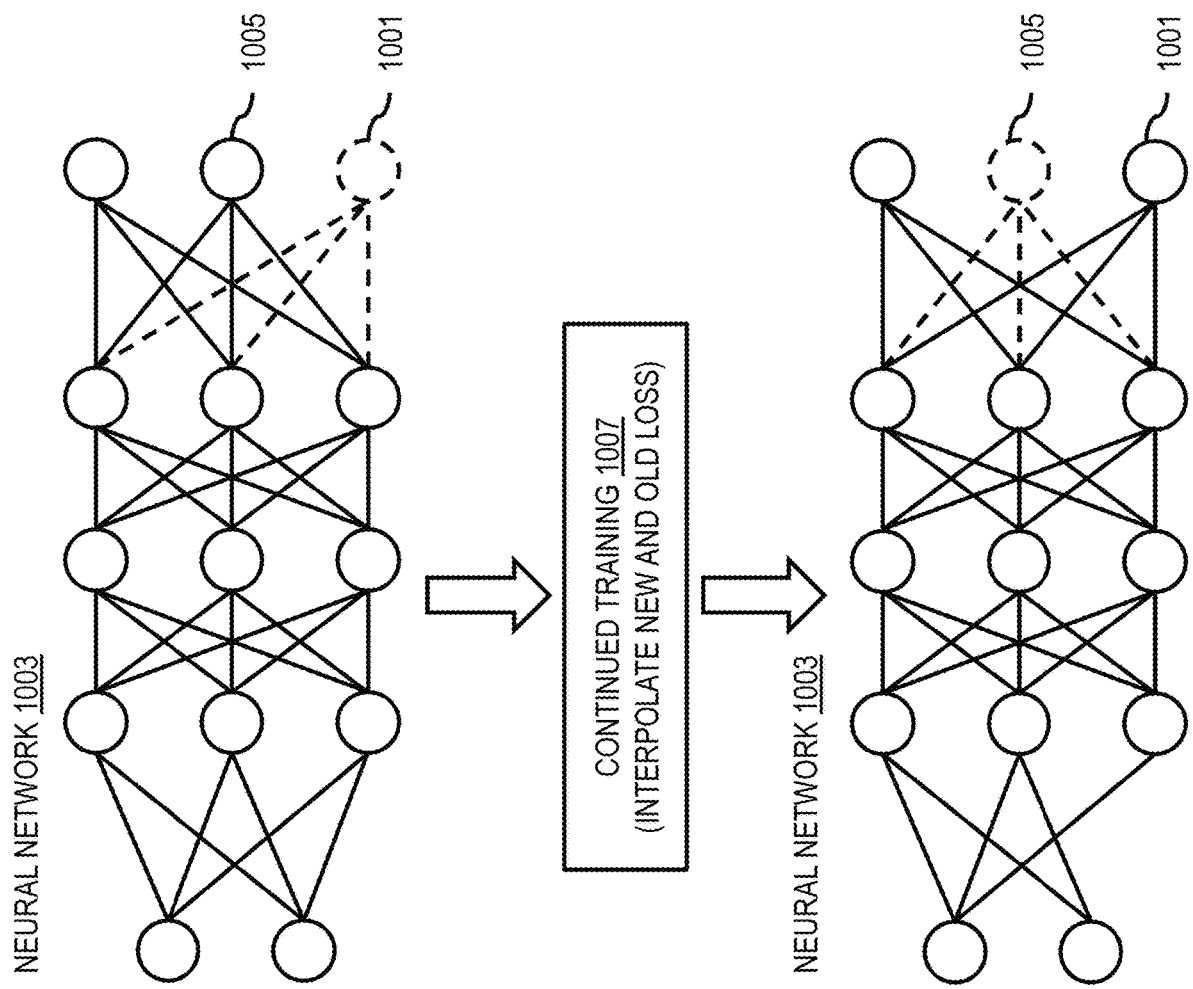
FIG. 10 is a diagram of an example of adding a new output to evolve a machine learning architecture, according to on embodiment.

FIG. 10 is a diagram of an example of adding a new output to evolve a machine learning architecture, according to one embodiment. In the example of FIG. 10, a new output neuron 1001 being added to the neural network 1003 next to an old output neuron 905 as an architectural change. The machine learning system 107 can also add associated loss functions that are weighted and summed together as the new loss in an interpolated fashion so that the weight of the new loss associated with the new output neuron 1001 from an initial or default level (e.g., 0) is interpolated to the weight of the old loss function associated with the old output (e.g., 1 or other designated level) over time. At the same time, the weight of the old loss function can be similarly decremented or interpolated to the initial or default level of the new loss. The machine learning model 109 undergoes continue training 1007 as the weights of the new loss and old loss are interpolated. Once the new loss forms the complete loss function (or forms greater than a threshold portion of the loss function) and the old loss is reduced to zero (or other designated level), the old output neuron 1005 can be removed, leaving the new output neuron 1001 in its place.

Returning to FIG. 1, in one embodiment, the trained machine learning model 109 can be used for a range of services and applications depending on accurate feature detection. For example, machine learning models 109 (e.g., identifying objects or features in images) enable a range of new services and functions including for applications such as autonomous driving, robotic systems, and/or the like that typically undergo relatively lengthy training phases. For example, with respect to autonomous driving, computer vision and computing power supporting feature detection and other related machine learning techniques have enabled real-time mapping and sensing of a vehicle's environment. Such an understanding of the environment enables autonomous, semi-autonomous, or highly assisted driving in a vehicle (e.g., a vehicle 101) in at least two distinct ways.

First, real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (lamp posts, e.g.) and dynamic (cats, deer, e.g.) obstacles, and these obstacles may change or appear in real-time. Thus, detecting such objects in image data collected by the vehicles (e.g., via trained machine learning models 109) can support such functionality. More fundamentally, vehicles 101 can use a semantic understanding of what areas around them are navigable and safe for driving. Even in a situation where the world is completely mapped in high resolution, exceptions will occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road features or obstacles using a computer vision system facilitated, for instance, by machine learning processes and feature detection models.

A second application of vision techniques in autonomous driving is localization of the vehicle 101 with respect to a map of reference landmarks. Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

With respect to lane localization and also generally with respect to autonomous driving, high accuracy and real-time localization of vehicles 101 are needed. Traditionally, most vehicle navigation system have accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

In general, a localization accuracy of around 10 cm is needed for safe driving in many areas. One way to achieve this level of accuracy is to use visual odometry, in which features are detected from imagery using machine learning model 109s 103 (e.g., a machine learning classifier). These features can then be matched to a database of features (e.g., stored in the geographic database 121) to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types (e.g., lane features such as lane markings, lane lines, etc.) can provide better and more accurate localization.

In response to these issues, the system 100 of FIG. 1 can focus on detecting high level features that have semantic meaning for human beings. One such feature that is important to autonomous driving is the detection of road features (e.g., signs, landmarks, buildings, etc.) and related identifying characteristics (e.g., corporate logos displayed on the signs, landmarks, buildings, etc. to more specifically identify the map features. Other potential features of interest include, but are not limited to, lane features (e.g., lane markings, lane lines, Botts' dots, reflectors, etc.) and corresponding lane models that can be detected in imagery. Lane-level information is important for self-driving applications because it defines the grammar of driving. Without knowledge of lane markings, it can difficult or impossible to determine where a vehicle 101 should drive, can drive, and what maneuvers are possible. As a result, the ability to detect lane-lines in real-time constitutes a fundamental part for the design of an autonomous vehicle 101.

In other words, the success of localization based on features detected from an image can depend on the precise localization of those features within the image and the quality of the technique used to detect the lane features or other similar features. This success, for instance, can depend greatly on how well trained a machine learning model 109 is. To create a well-trained machine learning or prediction model, the system 100 can use the embodiments described herein to create a high-quality training data set while minimizing associated costs, particularly, costs related to manual annotation.

As shown in FIG. 1, the system 100 includes the machine learning system 107 for progressive training of evolving machine learning models 109 according the various embodiments described herein. In some use cases, the system 100 can include the computer vision system configured to use machine learning to detect objects or features depicted in images. For example, with respect to autonomous driving, robotic systems, navigation, mapping, and/or other similar applications, the computer vision system can detect road features (e.g., lane lines, signs, etc.) in an input image and generate associated prediction confidence values, according to the various embodiments described herein. In one embodiment, the machine learning system 107 includes a neural network or other equivalent machine learning model (e.g., Support Vector Machines, Random Forest, etc.). In one embodiment, the neural network of the machine learning system 107 is a traditional convolutional neural network which consists of multiple layers of collections of one or more neurons (e.g., processing nodes of the neural network).

In one embodiment, the machine learning system 107 and/or the computer vision system also have connectivity or access to a geographic database 121 which stores representations of mapped geographic features to compare against or to store features or objects detected according to the embodiments described herein.

In one embodiment, the machine learning system 107 has connectivity over a communication network 111 to the services platform 113 that provides one or more services 115. By way of example, the services 115 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 115 use the output of the machine learning system 107 and/or machine learning model 109 to provide autonomous or robotic systems.

In one embodiment, the machine learning system 107 may be a platform with multiple interconnected components. The machine learning system 107 may include multiple servers, intelligent networking devices, computing devices, components and corresponding software for providing parametric representations of lane lines. In addition, it is noted that the machine learning system 107 may be a separate entity of the system 100, a part of the one or more services 115, a part of the services platform 113, or included within the client terminal 117, vehicle 101, robotic system 103, aerial drone 105, and/or the like.

In one embodiment, content providers may provide content or data (e.g., including geographic data, training data, etc.) to the geographic database 121, the machine learning system 107, the services platform 113, the services 115, the client terminal 117, the vehicle 101, and/or an application 119 executing on the client terminal 117. The content provided may be any type of content, such as map content, textual content, audio content, video content, image content, etc. In one embodiment, the content providers may provide content that may aid in the detecting and classifying of lane lines and/or other features in image data and estimating the quality of the detected features. In one embodiment, the content providers may also store content associated with the geographic database 121, machine learning system 107, computer vision system, services platform 113, services 115, client terminal 117, vehicle 101, robotic system 103, aerial drone 105, and/or the like. In another embodiment, the content providers may manage access to a central repository of data, and offer a consistent, standard interface to data, such as a repository of the geographic database 121.

In one embodiment, the client terminal 117, vehicle 101, robotic system 103, aerial drone 105, and/or the like may execute a software application 119 to filter and/or collect data to progressively train machine learning models 109 according the embodiments described herein. By way of example, the application 119 may also be any type of application that is executable on the client terminal 117, vehicle 101, robotic system 103, aerial drone 105, and/or the like, such as autonomous driving applications, mapping applications, location-based service applications, navigation applications, content provisioning services, camera/imaging application, media player applications, social networking applications, calendar applications, and the like. In one embodiment, the application 119 may act as a client for the machine learning system 107 and perform one or more functions associated with filtering imagery to train a feature detection model alone or in combination with the machine learning system 107.

By way of example, the client terminal 117 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the client terminal 117 can support any type of interface to the user (such as "wearable" circuitry, etc.). In one embodiment, the client terminal 117 may be associated with the vehicle 101 or be a component part of the vehicle 101, robotic system 103, and/or aerial drone 105.

In one embodiment, the client terminal 117, vehicle 101, robotic system 103, aerial drone 105, and/or the like are configured with various sensors for generating or collecting environmental image data (e.g., for processing by the machine learning system 107 and/or computer vision system), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the client terminal 117, vehicle 101, robotic system 103, aerial drone 105, and/or the like may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the client terminal 117, vehicle 101, robotic system 103, aerial drone 105, and/or the like may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the client terminal 117, vehicle 101, robotic system 103, aerial drone 105, and/or the like may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the machine learning system 107, services platform 113, services 115, client terminal 117, vehicle 101, robotic system 103, aerial drone 105, and/or the like. communicate with each other and other components of the system 100 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
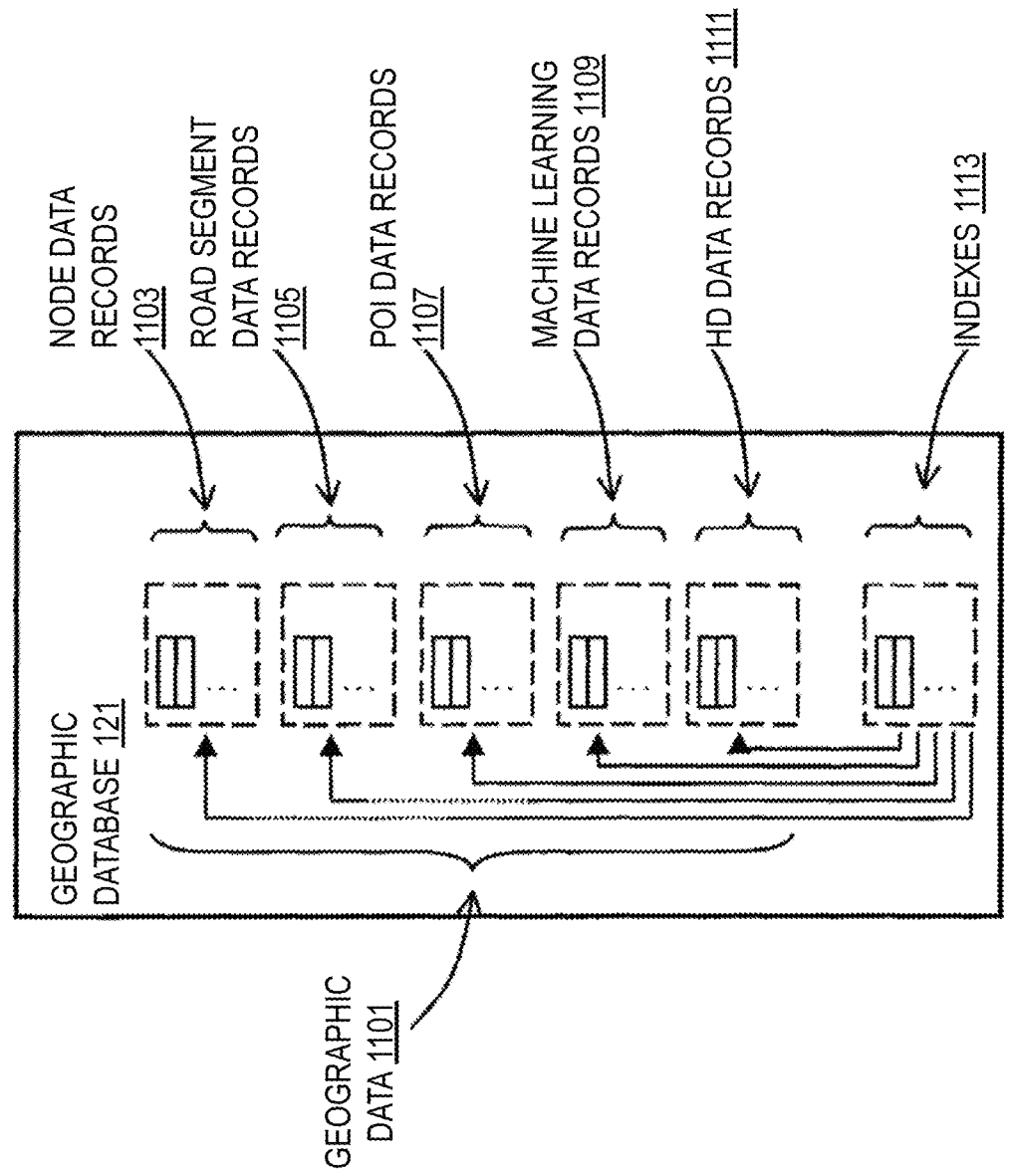
FIG. 11 is a diagram of a geographic database, according to one embodiment.

FIG. 11 is a diagram of a geographic database (such as database 121), according to one embodiment. In one embodiment, the geographic database 121 includes geographic data 1101 used for (or configured to be compiled to be used for) mapping and/or navigation-related services, such as for video odometry based on the parametric representation of lanes include, e.g., encoding and/or decoding parametric representations into lane lines. In one embodiment, the geographic database 121 include high resolution or high definition (HD) mapping data that provide centimeter-level or better accuracy of map features. For example, the geographic database 121 can be based on Light Detection and Ranging (LiDAR) or equivalent technology to collect billions of 3D points and model road surfaces and other map features down to the number lanes and their widths. In one embodiment, the HD mapping data (e.g., HD data records 1111) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 121.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 121 follows certain conventions. For example, links do not cross themselves and do not cross each other except at a node. Also, there are no duplicated shape points, nodes, or links. Two links that connect each other have a common node. In the geographic database 121, overlapping geographic features are represented by overlapping polygons. When polygons overlap, the boundary of one polygon crosses the boundary of the other polygon. In the geographic database 121, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 121 includes node data records 1103, road segment or link data records 1105, POI data records 1107, machine learning data records 1109, HD mapping data records 1111, and indexes 1113, for example. More, fewer or different data records can be provided. In one embodiment, additional data records (not shown) can include cartographic ("carto") data records, routing data, and maneuver data. In one embodiment, the indexes 1113 may improve the speed of data retrieval operations in the geographic database 121. In one embodiment, the indexes 1113 may be used to quickly locate data without having to search every row in the geographic database 121 every time it is accessed. For example, in one embodiment, the indexes 1113 can be a spatial index of the polygon points associated with stored feature polygons.

In exemplary embodiments, the road segment data records 1105 are links or segments representing roads, streets, or paths, as can be used in the calculated route or recorded route information for determination of one or more personalized routes. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 121 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 121 can include data about the POIs and their respective locations in the POI data records 1107. The geographic database 121 can also include data about places, such as cities, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In one embodiment, the geographic database 121 can also include machine learning data records 1109 for storing training data, prediction models, annotated observations, computed featured distributions, sampling probabilities, and/or any other data generated or used by the system 100 according to the various embodiments described herein. By way of example, the machine learning data records 1109 can be associated with one or more of the node records 1103, road segment records 1105, and/or POI data records 1107 to support localization or visual odometry based on the features stored therein and the corresponding estimated quality of the features. In this way, the records 1109 can also be associated with or used to classify the characteristics or metadata of the corresponding records 1103, 1105, and/or 1107.

In one embodiment, as discussed above, the HD mapping data records 1111 model road surfaces and other map features to centimeter-level or better accuracy. The HD mapping data records 1111 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1111 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 1111 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1111.

In one embodiment, the HD mapping data records 1111 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 121 can be maintained by the content provider in association with the services platform 113 (e.g., a map developer). The map developer can collect geographic data to generate and enhance the geographic database 121. There can be different ways used by the map developer to collect data. These ways can include obtaining data from other sources, such as municipalities or respective geographic authorities. In addition, the map developer can employ field personnel to travel by vehicle (e.g., vehicle 101 and/or client terminal 117) along roads throughout the geographic region to observe features and/or record information about them, for example. Also, remote sensing, such as aerial or satellite photography, can be used.

The geographic database 121 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or client terminal 117, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing progressive training of evolving machine learning architectures may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
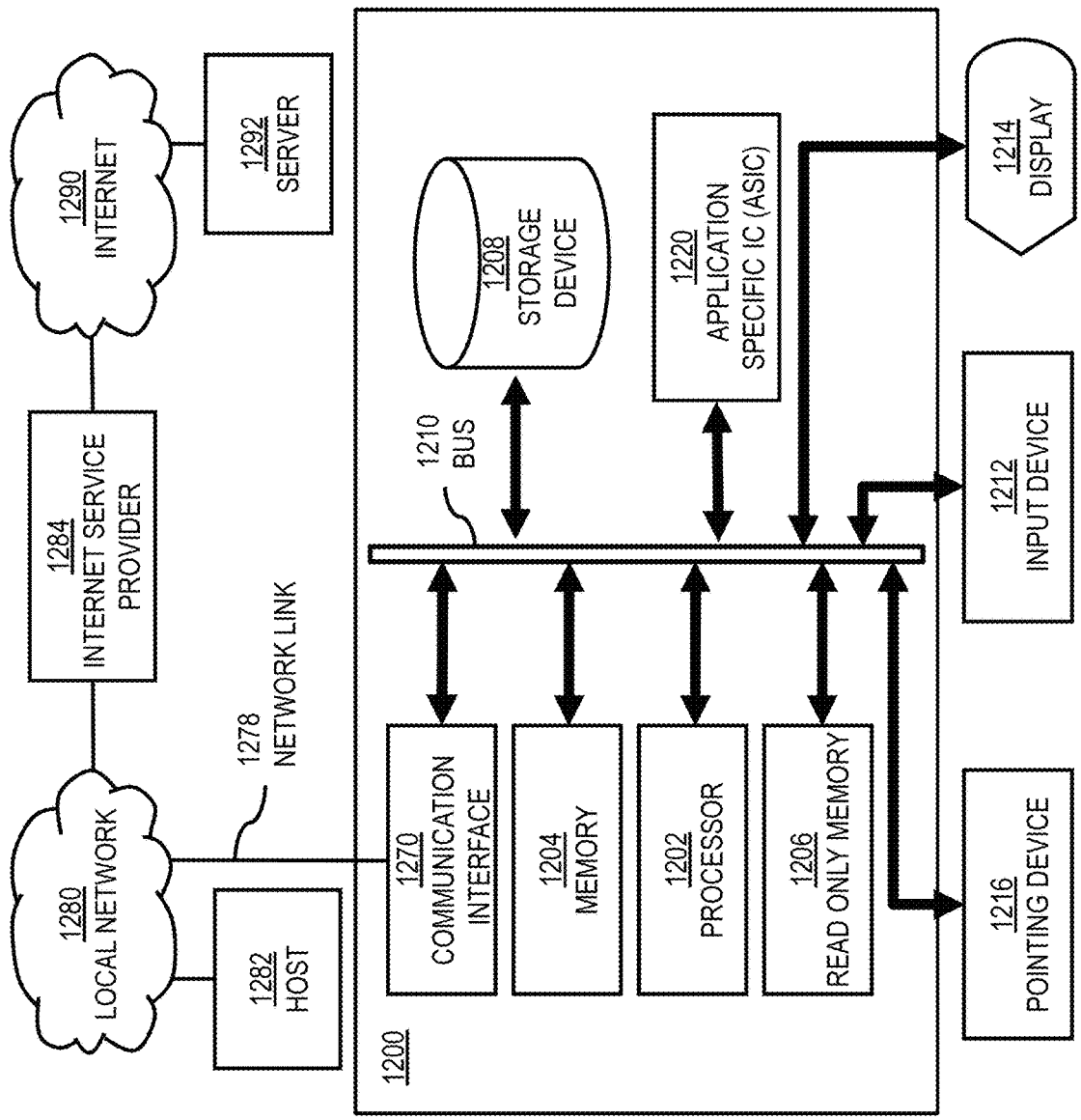
FIG. 12 is a diagram of hardware that can be used to implement an embodiment of the invention.

FIG. 12 illustrates a computer system 1200 upon which an embodiment of the invention may be implemented. Computer system 1200 is programmed (e.g., via computer program code or instructions) to provide progressive training of evolving machine learning architectures as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to providing progressive training of evolving machine learning architectures. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing progressive training of evolving machine learning architectures. Dynamic memory allows information stored therein to be changed by the computer system 1200. RANI allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing progressive training of evolving machine learning architectures, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 111 for providing progressive training of evolving machine learning architectures.

The term computer-readable medium is used herein to refer to any medium that participates in providing information to processor 1202, including instructions for execution.

Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system can be deployed in various configurations within other computer systems, e.g., host 1282 and server 1292.

FIG. 13 illustrates a chip set 1300 upon which an embodiment of the invention may be implemented. Chip set 1300 is programmed to provide progressive training of evolving machine learning architectures as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading.

The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide progressive training of evolving machine learning architectures. The memory 1305 also stores the data associated with or generated by the execution of the inventive steps.

Figure 14:
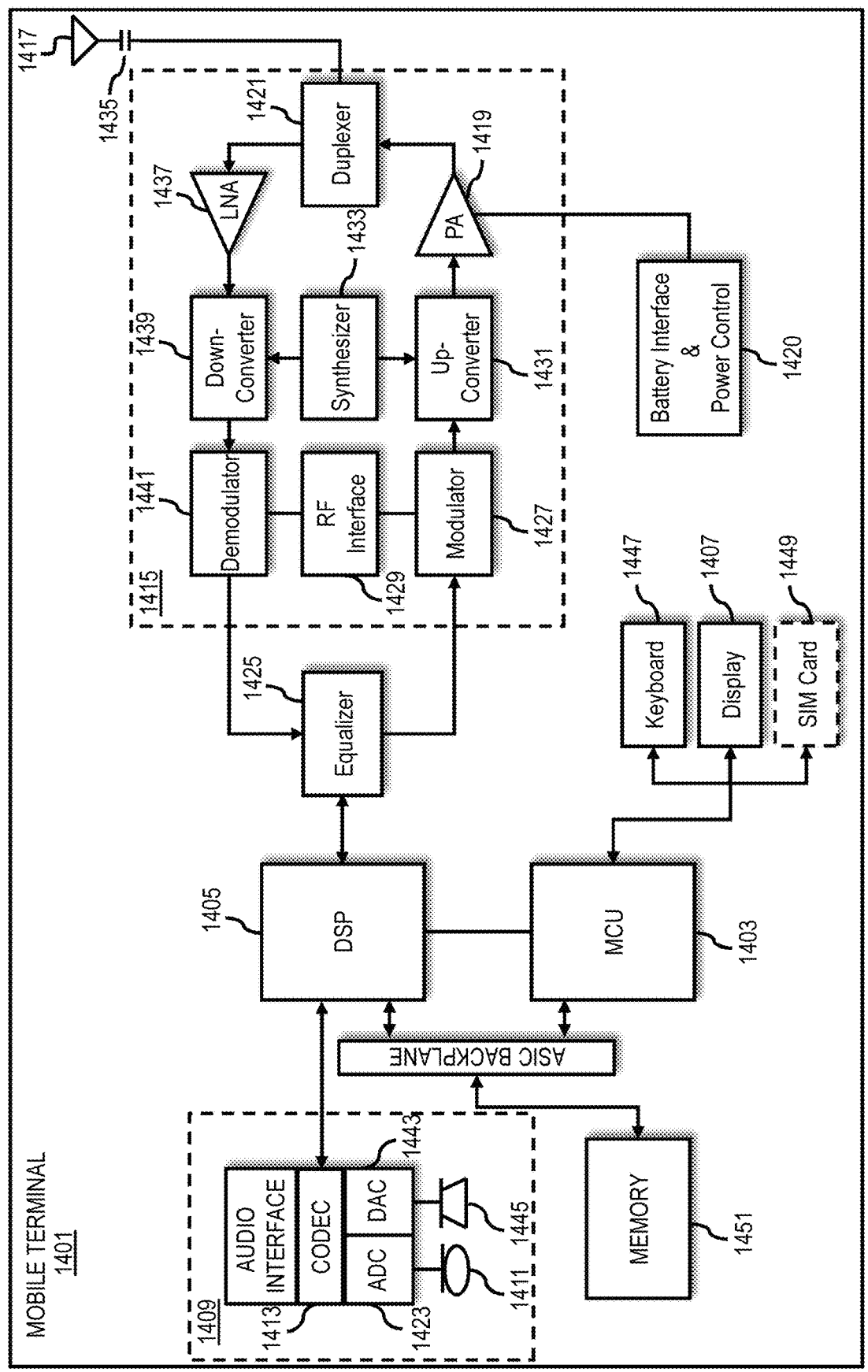
FIG. 14 is a diagram of a mobile terminal that can be used to implement an embodiment of the invention.

FIG. 14 is a diagram of exemplary components of a mobile terminal (e.g., client terminal 117, vehicle 101, robotic system 103, aerial drone 105, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to provide progressive training of evolving machine learning architectures. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for an evolution of a long-lived machine learning model over multiple architectures comprising:
    determining a plurality of alternative paths for the evolution of the machine learning model from a first architecture to a second architecture;
    determining one or more migration step alternatives in the plurality of alternative paths, wherein the one or more migration step alternatives include one or more architecture options for the evolution of the machine learning model;
    processing data using the one or more architecture options to determine respective model performance data, wherein the one or more architecture options include removing an input of the machine learning model by incrementally adding noise to an associated input signal;
    selecting a migration step from the one or more migration step alternatives based on the respective model performance data; and
    initiating a deployment the selected migration step to the machine learning model.

2. The method claim 1, wherein the selecting of the migration step is further based on controlling a rate of migration steps over a rate of training in the evolution of the machine learning model.

3. The method of claim 1, wherein the one or more migration step alternatives include adding or removing a neuron, adding or removing a neuronal layer, changing an activation function of the neuron, or a combination thereof of the machine learning model.

4. The method of claim 1, wherein a training of the machine learning model continues as the first architecture is migrated to the second architecture.

5. The method of claim 1, further comprising:
    based on determining that the respective model performance data does not meet a model performance threshold, performing at least one of:
        reducing the rate of migration steps;
        reverting the deployment of the selected migration step;
        redeploying the selected migration step with a reduced rate of change; and applying the reduced rate of change for one or more subsequent migration steps.

6. The method of claim 1, wherein the one or more migration step alternatives include adding an input to the machine learning model, and wherein the new input is added by adding the new input as a new connection in the machine learning model with a designated initial weight.

7. The method of claim 1, wherein the input is removed based on determining the noise is pure noise or has been incremented to greater than a threshold level.

8. The method of claim 1, wherein the one or more architecture options include adding a new output of the machine learning model.

9. The method of claim 8, wherein the new output is added next to an old output of the machine learning model.

10. The method of claim 9, further comprising:
changing one or more loss functions, wherein the one or more loss functions are weighted so that a new weight of a new loss associated with the new output is at a first designated level and an old weight of an old loss associated with the old output is at a second designated level, wherein the new weight and the old weight are interpolated through time so that that the new weight reaches the second designated level and the old weight reaches the first designated level; and
removing the old output based on determining that the old weight reaches the first designated level.

11. The method of claim 1, further comprising:
changing one or more activation functions in one or more neuronal units of the machine learning model by interpolating between an old activation function and a new activation function.

12. An apparatus comprising:
at least one processor; and
at least one memory including computer program code for one or more programs,
the at least one memory and the computer program code configured to, with the at least one processor, cause the apparatus to perform at least the following,
identify one or more migration step alternatives configured to migrate a first architecture of a machine learning model to a second architecture of the machine learning model, wherein the one or more migration step alternatives include one or more architecture options;
select a migration step from the one or more migration step alternatives;
process data using the one or more architecture options to determine respective model performance data;
select a rate change based on the respective model performance data; and
migrating the first architecture to the second architecture by applying the migration step to the first architecture based on the rate of change.

13. The apparatus of claim 12, wherein the rate of change is based on a number of training steps between a migration step and a subsequent migration step.

14. A non-transitory computer-readable storage medium, carrying one or more sequences of one or more instructions which, when executed by one or more processors, cause an apparatus to perform:
determining a plurality of alternative paths for the evolution of the machine learning model from a first architecture to a second architecture;
determining one or more migration step alternatives in the plurality of alternative paths, wherein the one or more migration step alternatives include one or more architecture options for the evolution of the machine learning model;
processing data using the one or more architecture options to determine respective model performance data, wherein the one or more architecture options include removing an input of the machine learning model by incrementally adding noise to an associated input signal;
selecting a migration step from the one or more migration step alternatives based on the respective model performance data; and
initiating a deployment the selected migration step to the machine learning model.

15. The computer-readable storage medium of claim 14, wherein the selecting of the migration step is further based on controlling a rate of migration steps over a rate of training in the evolution of the machine learning model.

16. The computer-readable storage medium of claim 14, wherein the one or more migration step alternatives include adding or removing a neuron, adding or removing a neuronal layer, changing an activation function of the neuron, or a combination thereof of the machine learning model.

17. The computer-readable storage medium of claim 14, wherein a training of the machine learning model continues as the first architecture is migrated to the second architecture.

18. The computer-readable storage medium of claim 14, further comprising:
based on determining that the respective model performance data does not meet a model performance threshold, performing at least one of:
reducing the rate of migration steps;
reverting the deployment of the selected migration step;
redeploying the selected migration step with a reduced rate of change; and
applying the reduced rate of change for one or more subsequent migration steps.

19. The computer-readable storage medium of claim 14, wherein the one or more migration step alternatives include adding an input to the machine learning model, and wherein the new input is added by adding the new input as a new connection in the machine learning model with a designated initial weight.

20. The computer-readable storage medium of claim 14, wherein the input is removed based on determining the noise is pure noise or has been incremented to greater than a threshold level.

\* \* \* \* \*